United States Patent [19]
Rodgers

[11] 3,983,322
[45] Sept. 28, 1976

[54] METHOD AND APPARATUS FOR CONVERTING THE LOCATION AND MOVEMENT OF A MANUALLY CONTROLLED INSTRUMENT INTO CORRESPONDING ELECTRICAL SIGNALS

[75] Inventor: James L. Rodgers, Tempe, Ariz.
[73] Assignee: Talos Systems, Inc., Scottsdale, Ariz.
[22] Filed: July 31, 1975
[21] Appl. No.: 600,820

[52] U.S. Cl............................. 178/19; 340/347 AD
[51] Int. Cl.².......................................... G08C 21/00
[58] Field of Search........................ 178/18, 19, 20; 340/146.3 SY, 347 AD

[56] References Cited
UNITED STATES PATENTS

| | | | |
|---|---|---|---|
| 3,591,718 | 7/1971 | Asano et al. | 178/19 |
| 3,767,858 | 10/1973 | Rodgers | 178/18 |
| 3,851,097 | 11/1974 | Rodgers | 178/19 |
| 3,865,977 | 2/1975 | Hiraki et al. | 178/19 |

Primary Examiner—Thomas A. Robinson
Attorney, Agent, or Firm—Cahill, Sutton & Thomas

[57] ABSTRACT

A system is disclosed for converting the location and movement of a manually controlled instrument into corresponding electrical signals. The manually controlled instrument responds to the phase and frequency of an electrical field that varies to represent position information on an orthogonal writing grid. A single, phase-locked loop is utilized to produce both a first signal corresponding to the instrument location along an x-axis and as second signal corresponding to the instrument location along a y-axis. The first and second signals both represent the differential between pairs of related absolute signals. The differential signals are independent of normal signal variations and other error sources.

10 Claims, 4 Drawing Figures

METHOD AND APPARATUS FOR CONVERTING THE LOCATION AND MOVEMENT OF A MANUALLY CONTROLLED INSTRUMENT INTO CORRESPONDING ELECTRICAL SIGNALS

BACKGROUND OF THE INVENTION

This invention relates to information conversion systems, and more particularly, to a system for converting the location and movement of a manually controlled instrument into corresponding electrical signals.

DESCRIPTION OF THE PRIOR ART

In prior art systems for converting the position of an instrument into an analagous electrical signal, separate channels are utilized to produce signals corresponding to the orthogonal axes of a writing table. For example, in U.S. Pat. No. 3,767,858, the mechanical position of a writing pen is converted in an analogous electrical signal by sensing the phase of a field set up in a writing table at the location of the pen. The sensed signal is a composite of the signals corresponding to the pen position on the two orthogonal axes of the writing table. The composite signal is separated into individual signals which each pass through phase-locked loops to provide output signals representative of the pen position along each axis of the writing table.

Because separate channels are utilized in the above patent to produce the paired output signals, it is important to prevent any interference or interaction between the two channels. Additionally, in the above patent, the two signals corresponding to the pen position along the two axes are combined for transmission to a receiver which utilizes the position information. The two distinct signals are frequency modulated onto a carrier-subcarrier signal. As a result, an inherent inequality is introduced because the signal carried by the subcarrier cannot match the performance of the carrier signal. Not only does the subcarrier have a different inherent delay, but also it is less effectively isolated from phase variations. Unless a compensating circuit is utilized, data information relating to one axis will be distorted by comparison with the data corresponding to the other axis. Furthermore, any drift or variance inherent in the system circuitry produces a corresponding error in the signals being transmitted because the transmitted data utilizes a signal having an absolute value. Additionally, any variation between the circuits that process the signals of the two distinct channels will produce error or distortion in the transmitted position indicative data.

Because the pen senses the signal appearing at a position on the writing table, any error or distortion in the signal sensed will give a false indication of the pen location. Commonly, a writing material such as paper is placed between the writing table and the pen. This writing material introduces capacitive and dielectric effects at the pen-table interface. Any variation in the properties of the writing material will affect the sensed signal and produce erroneous data regarding the pen position. A related error results if the pen is held in a position other than perpendicular to the writing surface of the table.

To facilitate transmission of the position indicative data over telephone lines, and to indicate per movement and "pen up" or "pen down" information, a system was disclosed in U.S. Pat. No. 3,851,097 in which the two distinct signals representing the orthogonal position information and the signals representing related pen position information are all frequency modulated onto a carrier for transmission to a distant location. Although this system permits signal transmission to a distant location over the narrow frequency band of a telephone line with minimum transmission error and distortion, it does nothing to reduce the errors inherent in the generation of the position responsive signals. Such errors result from normal variations in system components, temperature effects, noise and other interference and random effects. These normal variations produce erroneous data since they represent variations from an absolute standard, just as the signals indicative of the pen position are variations from an absolute standard. Because of the transmission characteristics of telephone lines, the timing is altered between the carrier and subcarrier signals which further imbalances the information being transmitted over the two channels. Since the variations are not predictable quantitatively, they cannot be compensated for readily.

Another significant limitation of the above patents is found in the difficulty encountered in aligning equipment at a distant location with the writing table at the transmitting location. Where it is desired to utilize the electrical signals corresponding to the pen position to re-create the pen movement at the distant location, it is necessary to insure that the image area of the transmitting equipment is aligned with the image area of the reproducing equipment at the receiving location. Unless this is accomplished, even data that is transmitted error-free may produce meaningless information where there is no position at the receiving location that correlates to the transmitted data. Where multiple receivers are used, the alignment problem becomes compounded.

Such system as disclosed in the above patents are also restricted in the signal resolution they can provide. The dynamic range of such systems is a function of the deviation of signals from a nominal value and the ability of the equipment to distinguish such signal deviation and correlate it to position responsive information.

U.S. Pat. Nos. 3,530,241; 3,591,718; 3,624,293; and 3,670,103 disclose a variety of embodiments of systems for converting the position of an instrument on a writing surface into electrical signals corresponding to that position. These embodiments are all subject to some or all of the disadvantages and limitations set forth above.

Therefore, it is a first object of the present invention to provide method and apparatus for producing data signals corresponding to the position of a manually operated instrument, where the signals are not referenced against an absolute standard but represent a differential signal which is not responsive to undesirable signal variations.

Another object of the present invention is to provide method and apparatus for transmitting electrical signals corresponding to the position of a manually positioned instrument along orthogonal axes, where the signals representing each axis are transmitted over the same communication link with the same transmission quality.

It is also an object of the present invention to provide method and apparatus for utilizing common circuitry to produce signals corresponding to the position of a manually positioned instrument along the orthogonal axes.

Still another object of the present invention is to provide method and apparatus for increasing the dynamic range and improving the resolution of transmitted signals in a system for converting the position of an instrument on a surface into corresponding electrical signals.

It is another object of the present invention to provide method and apparatus for reducing the need to align transmit and receive equipment within such a system for converting the position of an instrument on a surface into corresponding electrical signals.

Yet another object of the present invention is to provide method and apparatus for reducing the number of components and thereby the cost of a system for converting the position of an instrument on a surface into corresponding electrical signals while simultaneously increasing the reliability thereof.

An additional object of the present invention is to provide method and apparatus for isolating the output signals of a system for converting the position of an instrument on a surface into corresponding electrical signals from each other to permit those signals to be transmitted over a common communication link.

It is also an object of the present invention to provide method and apparatus for improving the accuracy of a system for converting the position of an instrument on a surface into corresponding electrical signals.

Another of the objects of the present invention is to provide method and apparatus for reducing capacitive and dielectirc errors at the interface between the instrument and the writing surface in a system for converting the position of an instrument on a surface into corresponding electrical signals.

SUMMARY OF THE INVENTION

Briefly stated, and in accordance with one embodiment of the present invention, a writing table including an orthogonal conductor grid produces a pair of variable characteristic signals in response to two different signal patterns applied to the grid. The paired signals are unique at each position of the writing table. As a manually operated instrument moves across the writing table, it senses the changing signals. The position of the instrument is indicated by the correlation between a first signal representing its position relative to one axis of the orthogonal grid and a second signal representing its position relative to the other axis of the grid. The first and second signals are each produced by comparing the sensed response to the two different signal patterns applied to the grid. By utilizing two different signal patterns applied to the grid. By utilizing the differential between the compared signals to indicate the position of the instrument on the grid, the system does not respond to normally encountered signal variations.

DETAILED DESCRIPTION OF THE ILLUSTRATIVE EMBODIMENT

Figure 1:
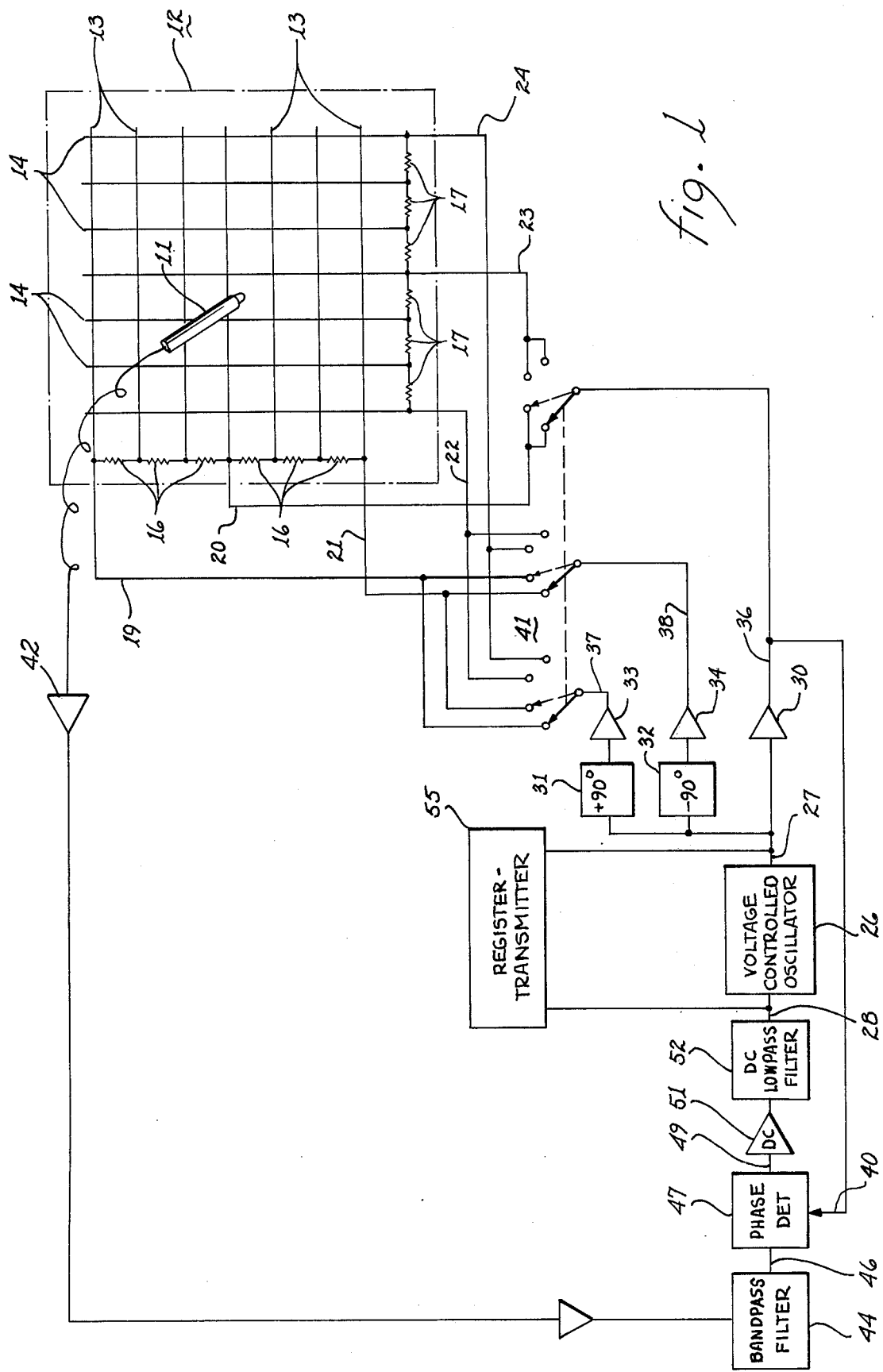
FIG. 1 is a schematic representation of a system embodying the present invention.

The significant components of a system to convert the position of a manually operated instrument into corresponding electrical signals are shown in FIG. 1. Such a system includes a pen and sensor 11 which moves across a writing grid 12 under manual control. Grid 12 includes a first group of parallel conductors 13 located along one axis of the orthogonal grid. A second group of parallel conductors 14 is positioned along the other axis of the grid. To prevent conductors 13 from contacting conductors 14, they are placed in parallel but slightly spaced apart planes. A solid writing surface is positioned over both groups of conductors 13 and 14 to support writing material which may be marked by pen 11.

The complete operation of pen 11 was disclosed in U.S. Pat. No. 3,886,311. No attempt will be made here to fully explain the features of the pen, but merely to explain its function in this system. Pen 11 transmits signals that indicate its position relative to the writing surface. When pen 11 is "up" or off the surface of the writing surface, that position is indicated by a distinctive signal. Similarly, when the pen is "down" on the surface, another distinctive signal indicates that fact. Such "pen drop" information is transmitted, as fully explained in the patent identified above, and may be utilized at some distant location to duplicate the position of the pen. Pen 11 also responds to signals from grid 12 as will be explained later in detail. These signals are indicative of the position of pen 11 relative to the orthogonal axes of grid 12. These position indicative signals may also be transmitted to a distant location to permit the movement and position of pen 11 to be traced at the distant location.

A plurality of equal amplitude, but phase displaced signals are applied to the conductors of grid 12. Due in part to the effect of resistors 16 which connect between conductors 13 and resistors 17 which connect between conductors 14, an electrostatic field is established across the writing surface of grid 12. Pen 11 includes a pickup element that senses the electrostatic field. Since the field varies across the writing surface of grid 12, the sensed field produces signals that are uniquely associated with the position of pen 11 on grid 12.

Because the control circuitry of this system is a closed loop, as will be explained, there is no "start" or "end" to assist in its explanation. Accordingly, this explanation of the system begins at a voltage controlled oscillator 26 merely because it is centrally located. Oscillator 26 has a nominal frequency but its output frequency may be varied in response to the application of a DC voltage at its input as will be explained. For illustrative purposes only, the nominal frequency of oscillator 26 will be selected as 10,000 Hz. Output 27 of oscillator 26 connects to an amplifier 30. Output 27 also connects to a phase shifter 31 and to a phase shifter 32. Phase shifter 31 alters the phase of the signal on output 27 by +90° while phase shifter 32 alters the phase of the signal on output 27 by −90°. The output from phase shifter 31 connects to an amplifier 33 and the output of phase shifter 32 connects to an amplifier 34.

The amplitude of the output signals from amplifiers 30, 33 and 34 are equal to each other, although they differ in phase relationship at their respective outputs 36, 37 and 38. Output 36 is in phase with output 27 while output 37 leads by 90° and output 38 lags by 90°. Outputs 36, 37 and 38 connect to conductors 13 and 14 through switching means whose function will be explained later in detail. Although this switching means has been indicated as a four-position, three-gang mechanical switch 41 for ease of explanation, it should be understood that this is not a requirement of the system. In fact, a more common embodiment would be to utilize electronic switching elements to control the connections between outputs 36, 37 and 38 and conductors 13 and 14. However, because it is easier to visualize the connections that result, switch 41 will be utilized for illustrative purposes.

The signal that is sensed by pen 11, as was explained above, is amplified by a line amplifier 42. The output of amplifier 42 connects to a bandpass filter 44. The output of filter 44 is applied to lead 46 which connects to the input to a phase detector 47. A second input 40 originating at output 36 from amplifier 30 also connects to phase detector 47. The output from phase detector 47 connects to a lead 49 which provides the input to a DC amplifier 51. Amplifier connects through a DC lowpass filter 52 to the input 28 of oscillator 26.

Operation of the System

With the moveable contacts of switch 41 in the position shown in solid line in FIG. 1, output 36 connects to a center input 20 of grid 12. Outputs 37 and 38 connect respectively to a top input 19 and to a bottom input 21 of grid 12. Inputs 19, 20 and 21 connect to conductors 13 of grid 12 to establish the variable Y field across the grid. As pen 11 moves in the Y direction, or up and down on grid 12, it will sense changes in this variable field.

Figure 2:
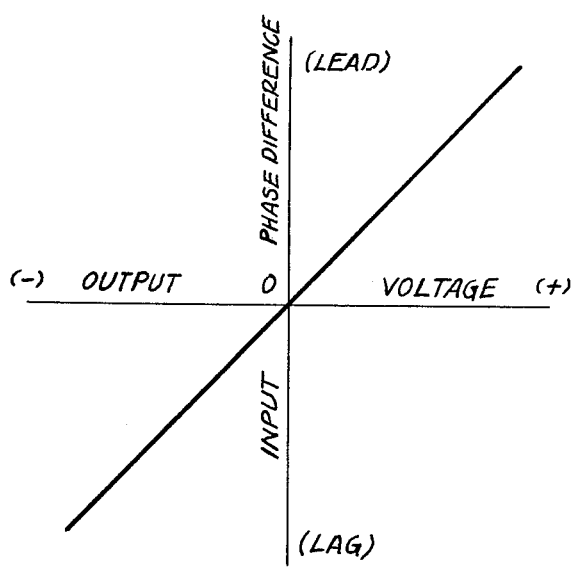
FIGS. 2 through 4 are graphical representations of signal characteristics at indicated points in the schematic of FIG. 1.
Figure 3:
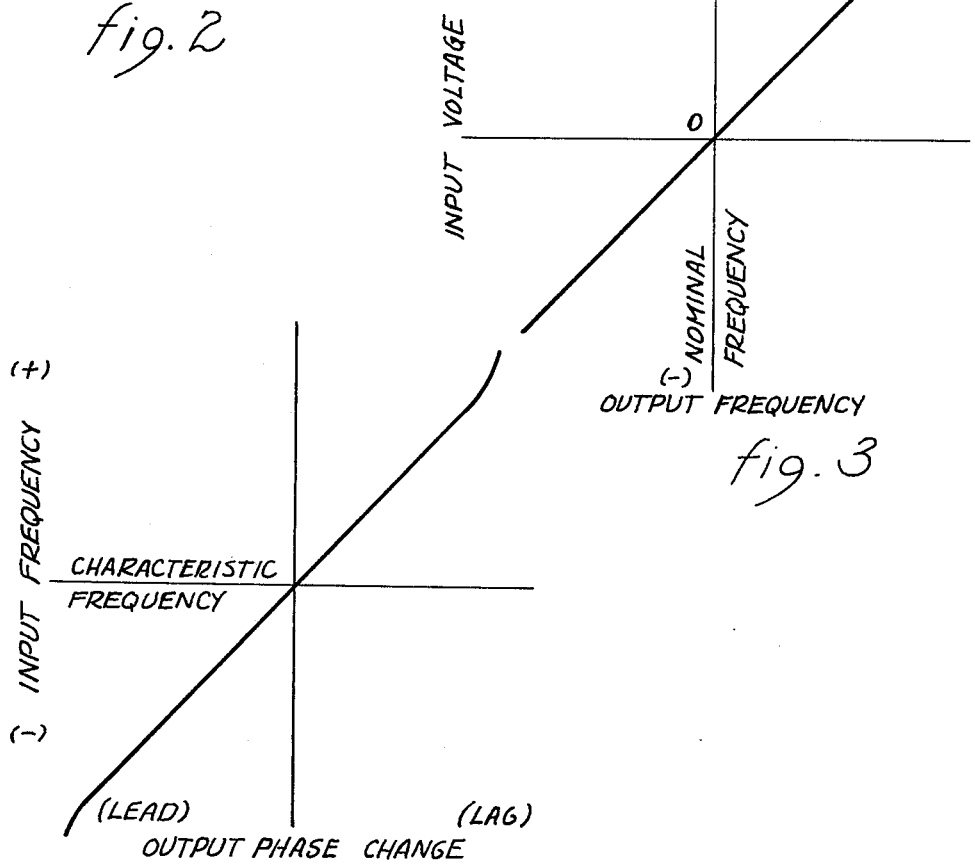

If pen 11 is positioned directly over the center conductor of conductors 13, which connects to input 20, a 10,000 Hz signal in phase with output 36 will be sensed. As will become apparent as this explanation continues, output 36 serves as a reference signal for the system and the phase of all signals is determined relative to the phase of the signal on output 36 and lead 40 to which it connects. The sensed signal is transmitted through amplifier 42 and filter 44 to be applied via lead 46 to the input to phase detector 47. Since the signal applied to phase detector 47 via lead 46 is in phase with the signal at the input from lead 40 (which connects to reference output 36), phase detector 47 will have no output signal. Phase detector 47 produces an output signal, a DC voltage, in response to the phase difference between the input signals applied at leads 40 and 46. The relationship between the input and output signals of phase detector 47 is shown graphically in FIG. 2. It can be seen that no output voltage results when the signals at the two inputs 40 and 46 have a predetermined relationship to each other. With no output signal present from detector 47, the input 28 to oscillator 26 has no voltage appearing thereon. This represents an equilibrium condition and the output frequency of oscillator 26 will not change. The equilibrium condition of oscillator 26 is indicated in FIG. 3 where the graphical representation between input voltage and output frequency is shown.

Figure 4:
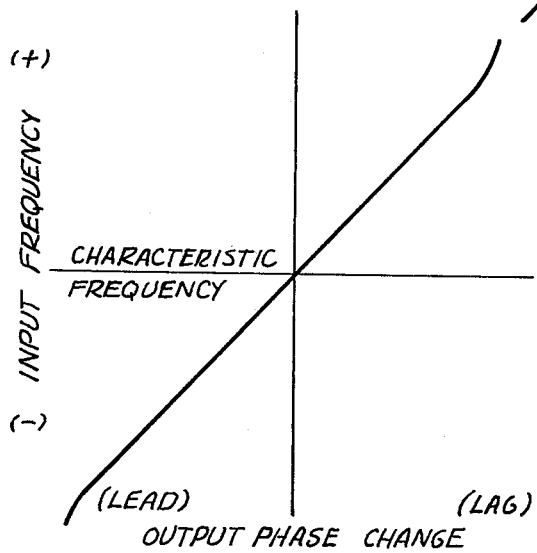

If pen 11 could be instantaneously moved to a position near the top conductor of conductors 13, it would sense a 10,000 Hz signal that is out of phase relative to the reference signal appearing on lead 40. The sensed signal will be amplified by amplifier 42 and applied to the input to bandpass filter 44. Because the applied signal is at the characteristic frequency of filter 44, it will not be attenuated. However, filter 44 not only acts to attenuate the amplitude of applied signals outside its characteristic frequency, it also acts as a frequency to phase translator in accordance with the graphical representation of FIG. 4. As FIG. 4 shows, there is no phase change at the characteristic frequency of filter 44. However, at lower frequencies applied to the input to filter 44, a lead phase change results on its output lead 46. Similarly, if a higher frequency is applied to filter 44, the output lead 46 will carry a lagging phase signal. The phase of the signal applied to the lead 46 due to the present position of pen 11 will be out of phase with the reference signal 40. Since a leading phase signal was applied at input 19, it is a leading phase signal applied to phase detector 47 via lead 46. This phase differential produces an output voltage in accordance with FIG. 2, resulting in a positive DC voltage being applied to input 28 of oscillator 26. The application of a positive voltage to oscillator 28 will cause its output frequency to increase in accordance with the relationship shown in FIG. 3.

Assuming that the output frequency of oscillator 26 increases to 11,000 Hz and that is an equilibrium position relative to the phase of the signal appearing at the pen position, the signals in the closed loop beginning at oscillator 26 and extending through switch 41, grid 12, pen 11, filter 44, phase detector 47 and back to oscillator 26 will become stabilized. This condition, referred to as a "phase Y" signal, will be indicative of the position of pen 11 on grid 12. As will be explained later more fully, either the voltage of the signal appearing on lead 28 or the frequency of the signal appearing on lead 27 may be correlated to the position of pen 11. Both leads connect as inputs to a register-transmitter 55, although either lead would contain sufficient data by itself. The phase Y signal will be stored in the register portion of register-trasmitter 55 for later use, as will be explained.

Switch 41 now advances to the next position, as shown in dotted position on FIG. 1. The lagging and leading phase inputs to grid 12 are now reversed. Center input 20 continues to carry a signal in phase with reference lead 40; however, top input 19 now carries a lagging signal, while bottom input 21 carries a leading signal. Pen 11 is still positioned near the top conductor of conductors 13. As a result, the phase of the induced signal that is sensed by pen 11 will reverse itself in sign. This will produce an out-of-equilibrium condition and the components will again act to offset that condition. Because of the phase difference now appearing between lead 46 and reference lead 40, a negative voltage will appear on input lead 28. This will cause the output frequency of oscillator 26 to go below its nominal frequency. When equilibrium conditions once again prevail, the signals appearing on leads 27 and 28 will be indicative of this second condition, called "inverted phase Y." The significance of this second signal will also be explained later in detail.

Switch 41 is next advanced to its third position, in a clockwise direction as shown in FIG. 1. Output lead 36 connects to a middle input 23 of conductors 14 while a left input 22 connects to the leading phase signal of output 37 and a right input 24 connects to the lagging phase signal of output 38. None of the outputs 36, 37 and 38 connect to any input to conductors 13 so that any signal sensed by pen 11 is now a result of its position relative to conductors 14 and the field produced by the signals now appearing thereon. The control loop will again cause the frequency of oscillator 26 to vary until an equilibrium condition, called "phase x," is obtained. the phase x signal is indicative of the position of pen 11 along the x-axis, or in the left-right direction across conductors 14. Again, the phase x signal's significance will be explained later in detail.

The last position of switch 41, before it returns to its initial position for a subsequent cycle, is shown in the extreme clockwise position. Similar to the phase reversal that occured between the phase Y and inverted phase Y conditions, the connections to inputs 22 and 24 are reversed. This phase reversal produces an out-of-equilibrium condition. Once the control loop adjusts to obtain equilibrium, a signal indicative of the "inverted phase x" condition may be noted. The significance of the four signals, phase y, inverted phase y, phase x and inverted phase x will not be explained.

If the phase y and inverted phase y signals are compared with each other, either a voltage difference is obtained from a comparison of the lead 28 signals or a frequency difference is obtained from a comparison of the lead 27 signals. For purposes of illustration, the frequency signals appearing on lead 27 will be discussed. If the frequency corresponding to phase y is 11,000 Hz and the frequency corresponding to inverted phase y is 9,000 Hz, the comparison of the two signals produces a +2,000 Hz differential signal. This differential signal is as unique to the position of pen 11 on grid 12 as would the single signal used in the prior art. The prior art signal is in fact a comparison signal too, except it is the differential between zero and the determined value. The significance of the differential signal in accordance with the present invention can be appreciated if it is assumed that the nominal frequency of oscillator 26 has drifted from its design value of 10,000 Hz to a true value of 10,050 Hz. This drift could result from effects of temperature, component tolerance, etc. Utilizing the prior art approach, a single signal corresponding to the position of pen 11 on grid 12 would be obtained. However, the signal would include an error component since a comparison with an absolute standard is employed. Utilizing the differential signal approach of the present invention, no resultant error would be introduced. Each reading, phase y and inverted phase y, would include the influence of the error produced by the drift of oscillator 26. However, the effects of the error would be opposite in character due to the phase reversal between the input signal conditions. As a result, each signal would include an absolute error, but there would be no differential error because the influences would be cancelled.

A related advantage is obtained from use of the differential signal rather than a single absolute signal. It is advantageous to have a symmetrical output from the writing grid. That is, a position located a first distance from the center of the grid should create a signal equal to that produced at a second position located the same distance as the first from the center, but in the opposite direction. Because bandpass filters are usually non-symmetrical, prior art systems have been unable to provide symmetrical output information directly but relied on compensating circuits to produce the effect. In the system of the present invention, such compensation is unnecessary. Rather, the differential signal corresponding to a position on either side of the center will include the effects of both high and low frequency components (lagging and leading phase signals). Any effects of the non-symmetrical characteristics of the bandpass filter will cancel each other. As a result, the position of a pen located a fixed distance above, below, left or right of center will produce symmetrical output signals.

Isolation from nominal variations in the signals applied to grid 12 and processed by the closed control loop, similar to that obtained with reference to the phase y and inverted phase y signals, results from a comparison of the phase x and inverted phase x signals if the differential between them it utilized rather than the absolute signal values. Related to this error isolation resulting from nominal variations in the circuitry, a second type of error isolation results where the data obtained is transmitted to a remote location. By transmitting the absolute value signals to the remote location and then obtaining the differential of them, the differential signal will cancel the influences of any transmission error affecting both signals, such as frequency shifts in the transmission line, etc.

It will be noted that the same closed control loop that established equilibrium conditions for the y oriented signals also established equilibrium conditions for the x oriented signals. As a result, any relative errors that might have resulted from nominal variations in the similar circuitry that produced x and y signals in the prior art has now been isolated with the present invention. If an error or variation is introduced, it would be equally present in the x and y direction signals. As a result, no relative distortion would be introduced thereby.

Where the signals corresponding to pen position are to be transmitted to a remote location, a receiver-transcriber could be utilized to reproduce the movement of pen 11. Although such equipment has not been shown, it should be apparent to those skilled in the art that simple alterations in the receiving equipment in accordance with the prior art could be made to become compatible with data transmitted in accordance with the present invention. Although a system utilizing a pen-sensor has been described, it should be understood that any of a number of position translation devices could be used. For example, pen 11 could be replaced by a cursor with only obvious modifications to the system being required. Also, it should be understood that the nominal frequency of oscillator 26 need not be 10,000 Hz as described. Other frequencies are equally feasible. In fact, where telephone transmission of the output signals is contemplated, a nominal frequency of 1,500 Hz could be used which would be directly compatible with the transmission characteristics of a telephone line.

Bandpass filter 44 has been disclosed as having a single characteristic frequency. Actually, filter 44 could beneficially have multiple poles and be stagger-tuned in frequency to produce a composite filter having a wide bandwidth and a linear phase to frequency relationship.

The system as disclosed is comparable to a servo system having a closed loop with the signal on lead 40 providing feedback information. By converting the frequency change of oscillator 26 into a phase shift signal, filter 44 effectively closes the servo loop. Filter 44 also acts as a frequency to phase convertor and as an attenuator of the phase shift signal that is applied to the phase loop. However, without filter 44, the changing frequency resulting from movement of pen 11 across grid 12 would have no significance and the loop would remain open. Utilizing the frequency to phase translation capacity of filter 44, the filter acts as a reference for the system, allowing it to function as a true servo system. Accordingly, if the phase shift across grid 12 is increased to increase signal resolution and reduce errors, a smaller percentage of the signal must be applied to the phase-locked central loop to prevent system instability. This will reduce the effective loop gain which increases system errors. The increased dynamic range of grid 12 resulting from the increased phase shift can be compensated for by either increasing the number of poles in filter 44 or by narrowing its bandwidth.

Although an illustrative embodiment has been described, various other modifications and changes could be made by those skilled in the art without departing from the spirit and scope of the present invention. For example, the signals applied to grid 12 were described as varying +90° and −90° relative to the reference signal. By making appropriate changes in filter 44, signals varying up to +180° and −180° could be applied. Further, it was indicated that the register function was included with the transmitter equipment as part of register-transmitter 55. It should be understood that the four equilibrium signals could be transmitted individually as soon as determined and stored in a register at the remote location for subsequent utilization, or they could be stored at the transmitter location and then transmitted. Also, although there are advantages in transmitting all four equilibrium signals to the remote location before the differential signal is determined, thereby minimizing transmission errors, there may be applications where it is advantageous to transmit only the differential signals themselves. It should also be expressly uunderstood that the four equilibrium signals need not be transmitted in a analog format but could be readily converted to digital signals.

I claim:

1. A method for obtaining an electrical signal corresponding to the position of an instrument along an axis on a surface having a plurality of conductors orthogonally oriented with respect to said axis and positioned proximate said surface, said method comprising the steps of:
   a. generating a first signal having a predetermined frequency and phase;
   b. advancing the phase of said first signal to generate a second signal having the predetermined frequency and a phase leading said first signal;
   c. retarding the phase of said first signal to generate a third signal having the predetermined frequency and a phase lagging said first signal;
   d. generating a time varying electrostatic field across said surface by applying said first signal to a first of said conductors, applying said second signal to a second of said conductors, and applying said third signal to a third of said conductors;
   e. sensing the phase and frequency of the time varying electrostatic field at the position of the instrument and generating a control signal in response thereto having said predetermined frequency and a phase unique to said position;
   f. comparing said control signal to said first signal;
   g. changing the predetermined frequency until a first stable condition is reached in which said control signal compares to said first signal in accordance with a predetermined relationship;
   h. producing a first output signal representative of said first stable condition;
   i. reversing said second signal and said third signal to apply said second signal to said third conductor and said third signal to said second conductor, thereby changing the electrostatic field at the position of the instrument;
   j. sensing the changed electrostatic field and changing said control signal in response thereto;
   k. changing the predetermined frequency until a second stable condition is reached in which said changed control signal compares to said first signal in accordance with said predetermined relationship;
   l. producing a second output signal representative of said second stable condition; and
   m. combining said first output with said second output signal to obtain a differential output signal uniquely corresponding to the position of the instrument on said axis.

2. A method for obtaining an electrical signal corresponding to the position of an instrument on a surface having a plurality of orthogonally oriented conductors positioned proximate said surface, said method comprising the steps of:
   a. generating a first signal having a predetermined frequency and phase;
   b. advancing the phase of said first signal to generate a second signal having the predetermined frequency and a phase leading said first signal;
   c. retarding the phase of said first signal to generate a third signal having the predetermined frequency and a phase lagging said first signal;
   d. generating a time varying electrostatic field across said surface by applying said first signal to a first of said conductors, applying said second signal to a second of said conductors, and applying said third signal to a third of said conductors;
   e. sensing the phase and frequency of the time varying electrostatic field at the position of the instrument and generating a control signal in response thereto having said predetermined frequency and a phase unique to said position;
   f. comparing said control signal to said first signal;
   g. changing the predetermined frequency until a first stable condition is reached in which said control signal compares to said first signal in accordance with a predetermined relationship
   h. producing a first output signal representative of said first stable condition;
   i. reversing said second signal and said third signal to apply said second signal to said third conductor and said third signal to said second conductor, thereby changing the electrostatic field at the position of the instrument;
   j. sensing the changed electrostatic field and changing said control signal in response thereto;
   k. changing the predetermined frequency until a second stable condition is reached in which said changed control signal compares to said first signal in accordance with said predetermined relationship;
   l. producing a second output signal representative of said second stable condition;
   m. combining said first output signal with said second output signal to obtain a differential output signal uniquely corresponding to the position of the instrument along an axis on the surface; and
   n. then applying said first, second, and third signals to conductors associated with the other axis of the orthogonal orientation to obtain another differential output signal indicative of the instrument position relative to the other axis.

3. Apparatus for obtaining an electrical signal corresponding to the position of an instrument along an axis on a surface having a plurality of conductors orthogonally oriented with respect to said axis and positioned proximate said surface, said apparatus comprising in combination:

a. means for generating a first signal having a predetermined frequency and phase;
b. means for advancing the phase of said first signal to generate a second signal having the predetermined frequency and a phase leading said first signal;
c. means for retarding the phase of said first signal to generate a third signal having the predetermined frequency and a phase lagging said first signal;
d. means for generating a time varying electrostatic field across said surface by applying said first signal to a first of said conductors, applying said second signal to a second of said conductors, and applying said third signal to a third of said conductors;
e. means for sensing the phase and frequency of the time varying electrostatic field at the position of the instrument and generating a control signal in response thereto having said predetermined frequency and a phase unique to said position;
f. means for comparing said control signal to said first signal;
g. means for changing the predetermined frequency until a first stable condition is reached in which said control signal compares to said first signal in accordance with a predetermined relationship;
h. means for producing a first output signal representative of said first stable condition;
i. means for reversing said second signal and said third signal to apply said second signal to said third conductor and said third signal to said second conductor, thereby changing the electrostatic field at the position of the instrument;
j. means for sensing the changed electrostatic field and changing said control signal in response thereto;
k. means for changing the predetermined frequency until a second stable condition is reached in which said changed control signal compares to said first signal in accordance with said predetermined relationship.
l. means for producing a second output signal representative of said second stable condition; and
m. means for combining said first output signal with said second output signal to obtain a differential output signal uniquely corresponding to the position of the instrument on the surface.

4. Apparatus for obtaining an electrical signal corresponding to the position of an instrument on a surface having a plurality of orthogonally oriented conductors positioned proximate said surface, said apparatus comprising in combination:
a. means for generating a first signal having a predetermined frequency and phase;
b. means for advancing the phase of said first signal to generate a second signal having the predetermined frequency and a phase leading said first signal;
c. means for retarding the phase of said first signal to generate a third signal having the predetermined frequency and a phase lagging said first signal;
d. means for generating a time varying electrostatic field across said surface by applying said first signal to a first of said conductors, applying said second signal to a second of said conductors, and applying said third signal to a third of said conductors, said conductors corresponding to one axis of the orthogonal orientation;
e. means for sensing the phase and frequency of the time varying electrostatic field at the position of the instrument and generating a control signal in response thereto having said predetermined frequency and a phase unique to said position;
f. means for comparing said control signal to said first signal;
g. means for changing the predetermined frequency until a first stable condition is reached in which said control signal compares to said first signal in accordance with a predetermined relationship;
h. means for producing a first output signal representative of said first stable condition;
i. means for reversing said second signal and said third signal to apply said second signal to said third conductor and said third signal to said second conductor, thereby changing the electrostatic field of the position of the instrument;
j. means for sensing the changed electrostatic field and changing said control signal in response thereto;
k. means for changing the predetermined frequency until a second stable condition is reached in which said changed control signal compares to said first signal in accordance with said predetermined relationship;
l. means for producing a second output signal representative of said second stable condition;
m. means for combining said first output signal with said second output signal to obtain a differential output signal uniquely corresponding to the position of the instrument along one axis on the surface; and
n. switching means for switching said first, second, and third signals from said conductors corresponding to said one axis of the orthogonal orientation to conductors corresponding to the other axis of the orthogonal orientation to obtain another differential output signal indicative of the instrument position relative to the other axis.

5. A system for converting the position along an axis of a manually controlled instrument into electrical signals corresponding to the position of said instrument on a surface, said system comprising, in combination:
a. a surface on which said instrument is positioned, said surface including; a plurality of parallel, spaced apart conductors; and perpendicular to said axis;
b. a voltage controlled oscillator for producing a reference signal having an output frequency that varies in response to a variable input voltage signal in accordance with a predetermined relationship;
c. a lead phase shifter for producing a lead signal with the same frequency as said reference signal but having a leading phase relationship therewith;
d. a lag phase shifter for producing a lag signal with the same frequency as said reference signal but having a lagging phase relationship therewith;
e. switching means having a first switching position for applying said reference signal to one of said plurality of conductors, said lead signal to a second of said plurality of conductors and said lag signal to a third of said plurality of conductors thereby creating an electrostatic field whose phase varies across said surface relative to said plurality of conductors;
f. a sensor associated with said instrument for sensing the frequency and phase of the electrostatic field at the position of the instrument and generating a control signal in response thereto having the same frequency as said reference signal and a phase unique to said position;

g. a bandpass filter for translating said control signal into a servo control signal having a phase differing from the phase of said control signal by an amount related to the frequency of said control signal according to a predetermined relationship;

h. a phase detector for comparing the phase of said servo control signal with the phase of said reference signal and producing a servo output signal having a variable voltage whenever the phase difference between said servo control signal and said reference signal varies from a predetermined standard;

i. means for applying said servo output signal to the input of said voltage controlled oscillator to vary the output frequency thereof and obtain a stable condition in which the output frequency of said voltage controlled oscillator has a fixed relationship to said control signal;

j. a first register for storing a first absolute signal representative of said stable condition obtained in response to the signals applied by said first switching means;

k. said switching means having a second switching position for reversing the application of said lead signal and said lag signal so that said lead signal is applied to said third conductor and said lag signal is applied to said second conductor thereby creating another electrostatic field whose phase varies across said surface relative to said plurality of conductors;

l. a second register for storing a second absolute signal representative of said stable condition obtained in response to the signals applied by said second switching means; and m. means for combining said first absolute signal with said second absolute signal to produce a unique first differential output signal corresponding to the position on said surface of said instrument relative to said first plurality of conductors.

6. A system accordance with claim 5 further including:

a. a second plurality of parallel, spaced apart conductors, said second plurality being mutually perpendicular to, and electrically isolated from, said first plurality;

b. said switching means having a third switching position for applying said reference signal to one of said second plurality of conductor, said lead signal to a second of said second plurality of conductors and said lag signal to a third of said second plurality of conductors thereby creating an electrostatic field whose phase varies across said surface relative to said second plurality of conductors;

c. a third register for storing a third absolute signal representative of said stable condition obtained in response to the signals applied by said third switching means;

d. said switching means having a fourth switching position for reversing the application of said lead signal and said lag signal so that said lead signal is applied to said third conductors and said lag signal is applied to said second conductor thereby creating another electrostatic field whose phase varies across said surface relative to said second plurality of conductors;

e. a fourth register for storing a fourth absolute signal representative of said stable condition obtained in response to the signals applied by said fourth switching means; and e. means for combining said third absolute signal with said fourth absolute signal to produce a unique second differential output signal corresponding to the position on said surface of said instrument relative to said second plurality of conductors.

7. A system in accordance with claim 5 further including:

means for transmitting said first absolute signal and said second absolute signal to a location distant from said surface.

8. A system in accordance with claim 6 further including:

means for transmitting said first absolute signal, said second absolute signal, said third absolute signal and said fourth absolute signal to a location distant from said surface.

9. A system in accordance with claim 5 further including:

means for transmitting said first differential output signal to a location distant from said surface.

10. A system in accordance with claim 6 further including:

means for transmitting said first differential output signal and said second differential output signal to a location distant from said surface.

* * * * *